United States Patent [19]

Shankwitz et al.

[11] 3,841,771

[45] Oct. 15, 1974

[54] TAPERED HINGE PIN ASSEMBLY AND REMOVAL MEANS

[75] Inventors: Robert F. Shankwitz, Oswego; Anthony L. Garman, Stevensville, both of Ill.

[73] Assignee: Caterpillar Tractor Co., Peoria, Ill.

[22] Filed: Dec. 26, 1972

[21] Appl. No.: 318,516

[52] U.S. Cl.............. 403/163, 403/258, 403/370, 403/371, 29/256
[51] Int. Cl............................................ B23p 19/04
[58] Field of Search .......... 403/161, 163, 154, 155, 403/258, 292, 370, 371; 29/256, 257, 258, 427

[56] References Cited
UNITED STATES PATENTS

| 389,480 | 9/1888 | Massett | 403/370 X |
| 1,472,565 | 10/1923 | Manning | 403/370 X |
| 3,347,577 | 10/1967 | Carlson et al. | 403/371 X |
| 3,503,638 | 3/1970 | Holzel | 403/370 |
| 3,643,904 | 2/1972 | McMullen | 403/370 X |

Primary Examiner—Werner H. Schroeder
Attorney, Agent, or Firm—Phillips, Moore, Weissenberger, Lempio & Strabala

[57] ABSTRACT

The tapered hinge pin has a generally cup-shaped collar with an internal taper complementing the external tapered end portion of the hinge pin and is movable into wedged position in a surrounding bore by a first bolt passing through an enlarged threaded opening in an end wall of the collar and threadedly engaged in an axial bore in the tapered end portion of the pin. Disassembly of the hinge pin is achieved by removing the first bolt and inserting a second, larger-diameter bolt into the threaded opening in the collar end wall and advancing the second bolt by turning. Enhanced operation is achieved by providing an auxiliary bearing member in the form of either a stud insertable into the bore in the pin end or antecedently providing a washer around the first bolt intermediate the pin end and the collar end wall such that the washer drops and partially obturates the end wall opening upon removal of the first bolt so as to act as a bearing surface for the second bolt.

6 Claims, 5 Drawing Figures

PATENTED OCT 15 1974   3,841,771
SHEET 1 OF 2
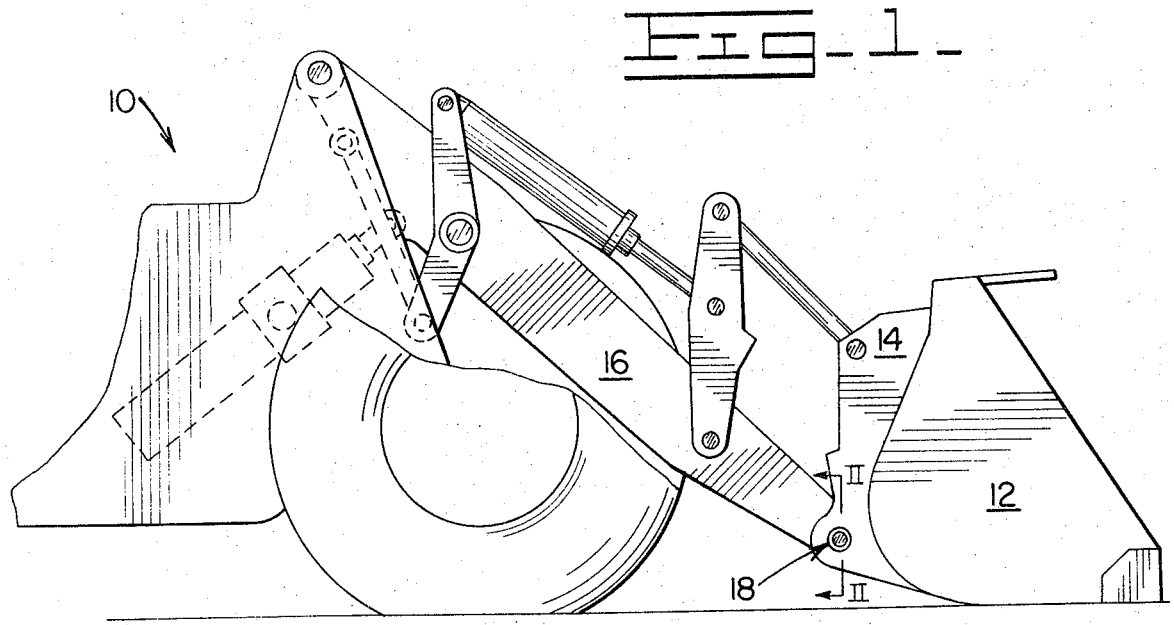
Fig-1-
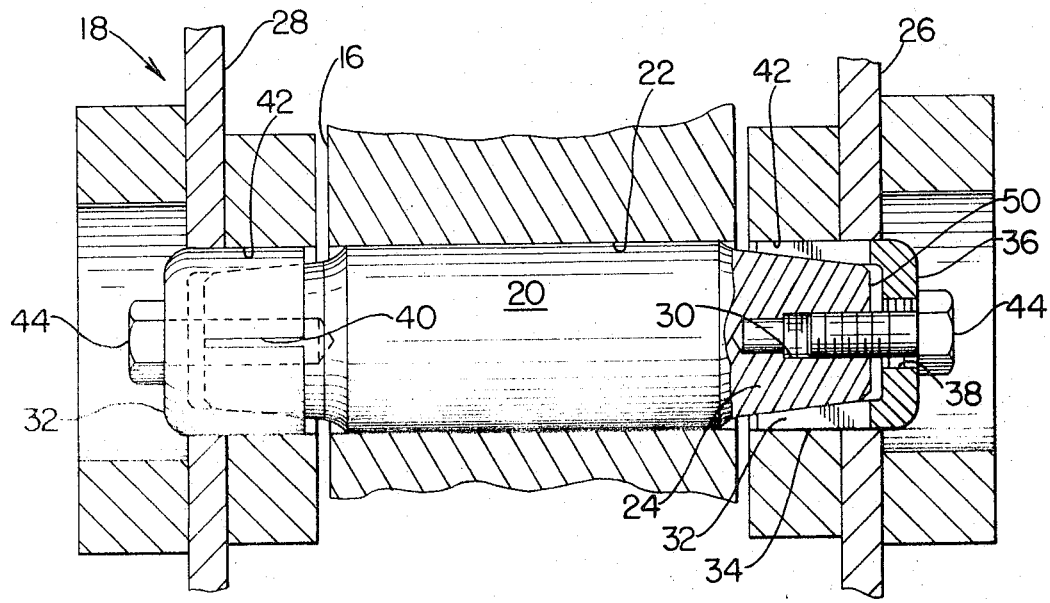
Fig-2-

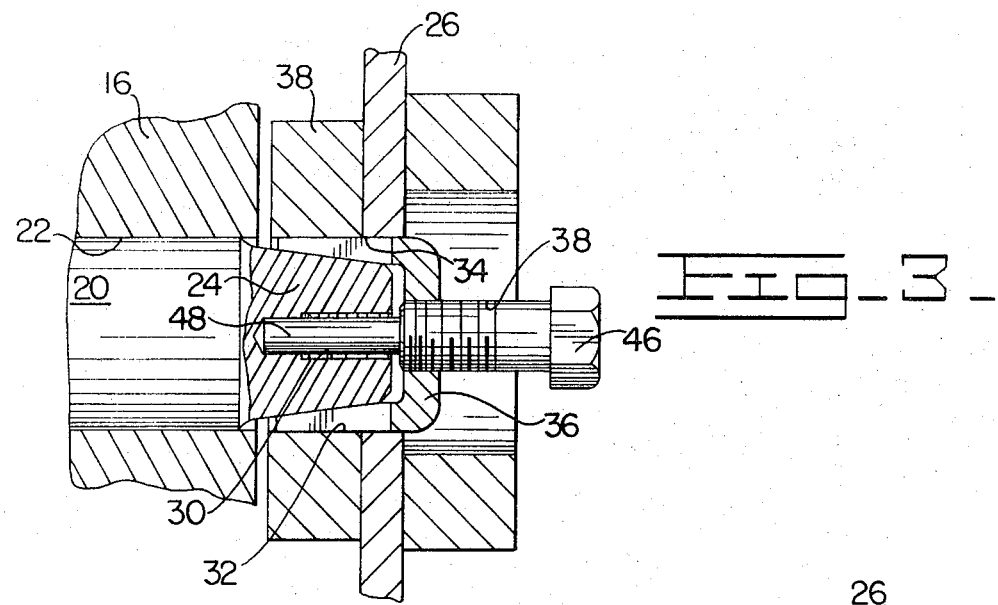
Fig_3_
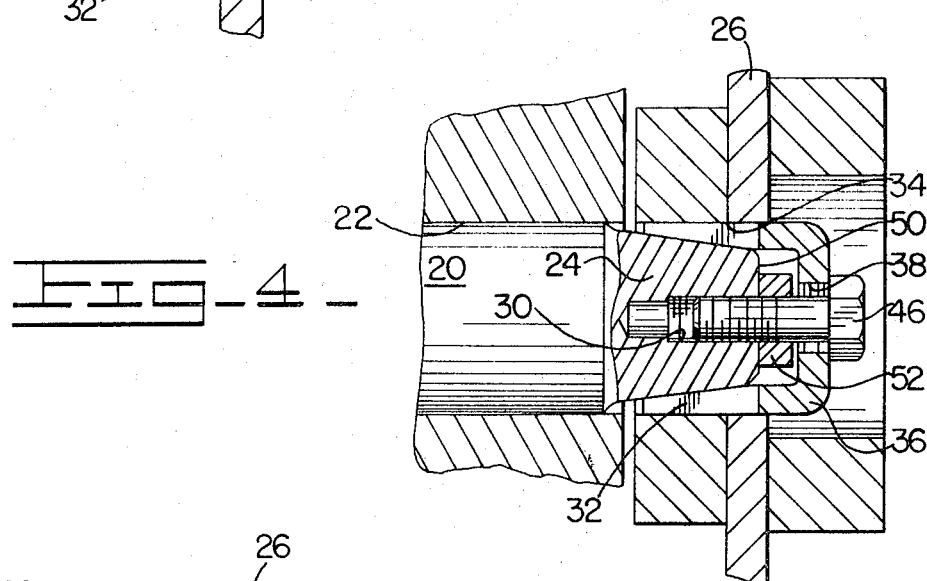
Fig_4_
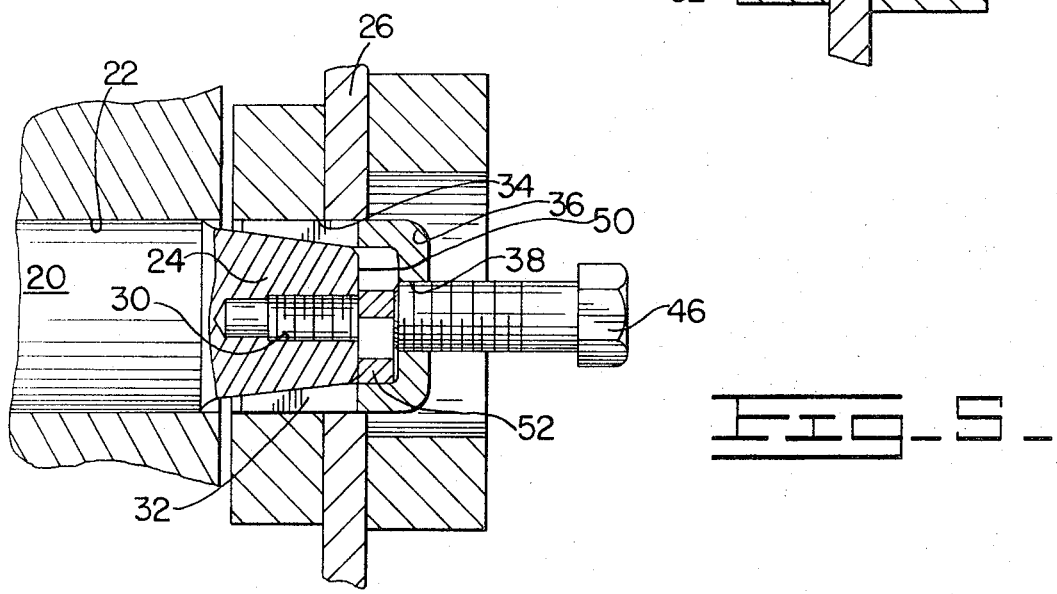
Fig_5_

TAPERED HINGE PIN ASSEMBLY AND REMOVAL MEANS

BACKGROUND OF THE INVENTION

This invention relates to a tapered hinge pin assembly mounted between load-transmitting members to form a pivotal connection therebetween. More particularly, this invention is related to an improved assembly and a means and method for removing same.

Pivot hinge pins have been used in providing pivotal connections between load-transmitting members as witnessed by U.S. Pat. Nos. 3,600,015 and 3,643,904, both to McMullen. One of the primary disadvantages of these tapered hinge pin assemblies is the fact that they require tools such as hydraulic presses to separate the elements of the assembly. This requirement makes field servicing and repair of vehicles employing such tapered hinge pin assemblies very difficult, thereby increasing repair and operating costs. One solution to this problem is shown in U.S. Pat. No. 3,537,735, to Hawk, wherein an integral device is provided for assisting in disassembling the hinge pin connection. The present invention is designed to be a more economical and effective apparatus and method in the form of a tapered hinge pin assembly and integral removal means.

The invention takes the form of a hinge pin having a generally cylindrical center portion fitted within the bore of an intermediate member having tapered end portions fitted within and spaced from the bores of a pair of bifurcated arms. A generally cup-shaped collar defining generally cylindrical sidewalls and an end wall fitted within each of the arm bores, the interior wall of collars being tapered so as to be in engagement with the tapered end portions of the hinge pin. The collar walls contain a plurality of axially extending slots and an axially disposed threaded bore is located in each end of the hinge pin. Concentric therewith, a threaded opening formed through the end wall of each collar receives a first bolt passing therethrough in spaced relation and in threaded engagement with the pin bore. A bolt on the first bolt head is positioned so as to contact the collar end wall on turning such that the collar is drawn toward the hinge pin so as to wedge the end portions thereof in the arm bores. The end wall opening is threaded whereby, by removing the first bolt and inserting and advancing a second and larger bolt in threaded engagement with the end wall opening, the collar is withdrawn from its wedged relationship with the arm bore.

The invention also includes a method whereby such hinge pin assembly is disassembled. In particular, the method includes insertion of a stud into the pin end bore intermediate the removal of the first bolt and the engagement of the second bolt so as to provide a bearing surface for the end of the second bolt.

The method also comprises, in the alternative, the provision of a washer intermediate the end of the pin and the collar end wall and over the first bolt whereby the washer serves to at least partially obturate the end wall opening and thereby provide a bearing surface for the second bolt end portion.

BRIEF DESCRIPTION OF THE DRAWINGS

FIG. 1 is a partial elevational view of a wheeled tractor loader utilizing the tapered hinge pin assembly of the present invention;

FIG. 2 is an enlarged cross-sectional view of a single tapered hinge pin assembly taken along lines II—II in FIG. 1;

FIG. 3 is a partial sectional view of the same showing the method of disassembly of the first embodiment of the invention;

FIG. 4 is a similar view of a second embodiment; and

FIG. 5 is a view of the second embodiment showing the disassembly method associated therewith.

DETAILED DESCRIPTION

FIG. 1 shows a wheeled tractor loader generally indicated at 10 employing the present invention. The tractor loader conventionally has a bucket 12 with a bracket plate 14 mounted thereto and pivotally attached to a pair of load arms, one of which is shown at 16 by means of a tapered hinge pin assembly generally shown at 18. While only one such pivotal connection employing a tapered hinge pin assembly is shown, it is to be understood that such arrangement may also be used at other pivot connections and that the following discussion may be thus considered as representative.

As shown in FIG. 2, the tapered hinge pin assembly 18 comprises a generally cylindrical hinge pin 20 fitted within a bore 22 in an intermediate member such as load arm 16. Each end of pin 20 has a tapered end portion within and in spaced relation to a respective one of a pair of bifurcatd arms 26, 28. Each end of the hinge pin 20 has an axially disposed, threaded opening or bore 30 formed therein. The generally cup-shaped collar 32 is disposed over each tapered end portion. The collar 32 comprises a cylindrical, wedge-shaped portion 34 defined by an internal taper and an end wall portion 36 having a threaded opening 38 axially located therethrough. The cylindrical or skirt portion of the collar has a plurality of axially directed slots 40 for facilitating wedging of the pin end 24 within a bore 42 in the bifurcated arm. A first, threaded bolt 44 having a diameter less than the end wall opening 38 is inserted therethrough in threaded engagement with axial pin bore 30. The head end of bolt 44 serves to draw the collar 34 into wedged engagement in a manner to be hereinafter described.

As shown in FIG. 3, disassembly of the abovedescribed tapered hinge pin assembly is achieved by removing the first bolt and inserting a second larger bolt 46 which is adapted to threadably engage end wall opening 38. By inserting the pin 48 in the opening 38 after removal of the first bolt and before insertion of the second bolt, bearing surface is provided for bolt 46. Pin 48 has a diameter slightly less than that of bore 38 and is of a length to reach from the bottom of said bore to a point adjacent the internal end wall portion 36 when the hinge pin assembly is in its assembled condition. By rotating and thereby axially advancing bolt 48, collar 32 is moved to the right as viewed in the drawing and out of wedged engagement. In the alternative, pin 48 could be omitted, in which case the end of bolt 44 would bear upon the pin end face 50 of the hinge pin 20.

FIGS. 4 and 5 illustrate a second embodiment utilizing yet another disassembly method. With this embodiment, an annular washer 52 is placed on first bolt 44 prior to assembly and as shown in FIG. 4. The washer's outer diameter is such, with relation to the inner diameter of the collar, as to allow the washer to drop down to the position shown in FIG. 5 in a chamber defined by the hinge pin end portion and the collar whereby the washer at least partially obturates the end wall opening 38. The washer should have an inner diameter at least as great as the external diameter of the first bolt such that the bolt can extend therethrough and an outer diameter which is less than that of the collar inner diameter. For best operation, the washer outer diameter should be approximately one half the collar inner diameter since, ideally, the washer should obturate the central portion of the opening in the collar end wall. Washer 52 thus provides a partial bridge across opening 38 and provides a supporting surface for the end of second bolt 46 in a manner similar to that previously described for the first embodiment.

It is to be understood that the foregoing description is merely illustrative of the preferred embodiments of the invention and that the scope of the invention is not to be limited thereto, but is to be determined by the scope of the appended claims.

What is claimed is:

1. In a hinge structure comprising a bifurcated member defining a pair of arms, an intermediate member located between said arms of the bifurcated member, means defining a bore through each arm and said intermediate member, said bores being in concentric alignment, a hinge pin in said bores having a generally cylindrical center portion fitted within the bore in said intermediate member and having tapered end portions, which tapered end portions are within and spaced from the bores of said arms, a generally cup-shaped collar defining generally cylindrical sidewalls and an end wall fitted within each of the arm bores, the interior wall of the collars being tapered so as to be in engagement with the tapered end portions of said hinge pin, said tapered walls containing a plurality of axially entending slots, axially disposed threaded bores in each end of said hinge pin, an end wall opening formed through the end wall of each collar, said opening being in concentric alignment with a respective hinge pin bore, said axially disposed threaded bores adapted to receive first bolt means passing through each end wall bore in spaced relation thereto and threadedly engaged in a respective hinge pin bore and having head means thereon for contacting a respective collar end wall whereby said collar is drawn toward said hinge pin so as to wedge the end portions thereof in respective arm bores when the first bolt means is tightened, and further including threads formed within each collar end wall opening so as to permit a second bolt means to be engaged therewith subsequent to removal of said first bolt means thereby facilitating removal of said collar.

2. The invention of claim 1 further including an annular washer member located within a chamber defined by each hinge pin end portion and the collar, said washer member having an inner diameter at least as great as said first bolt means such that said first bolt means extends therethrough and an outer diameter less than the inner diameter of the collar.

3. The invention of claim 2 wherein the outer diameter of said washer is equal to approximately one half the inner diameter of said collar.

4. The invention of claim 1 further including removal means for providing a bearing surface for the second bolt means for removal of said collar.

5. The invention of claim 4 wherein said removal means comprises a stud in said axially disposed threaded bores in said hinge pin.

6. The invention of claim 5 wherein said removal means comprises an obturating means located within a chamber defined by each hinge pin end portion and the collar and adapted to move into operative position at least partially obturating said axially disposed threaded bores in said hinge pin upon removal of the first bolt means.

* * * * *